United States Patent [19]
Chuang

[11] Patent Number: 5,371,864
[45] Date of Patent: Dec. 6, 1994

[54] APPARATUS FOR CONCURRENT MULTIPLE INSTRUCTION DECODE IN VARIABLE LENGTH INSTRUCTION SET COMPUTER

[75] Inventor: Chiao-Mei Chuang, Briarcliff Manor, N.Y.

[73] Assignee: International Business Machines Corporation, Armonk, N.Y.

[21] Appl. No.: 866,766

[22] Filed: Apr. 9, 1992

[51] Int. Cl.$^5$ .............................. G06F 9/32
[52] U.S. Cl. ......................... 395/375; 364/DIG. 1
[58] Field of Search ............... 395/375, 800, 425, 400

[56] References Cited

U.S. PATENT DOCUMENTS

| | | | |
|---|---|---|---|
| 4,131,941 | 12/1978 | Siegel et al. | 395/775 |
| 4,189,768 | 2/1980 | Liptay et al. | 395/375 |
| 4,236,206 | 11/1980 | Strecker et al. | 395/375 |
| 4,241,397 | 12/1980 | Strecker et al. | 395/375 |
| 4,251,862 | 2/1981 | Murayama | 395/375 |
| 4,335,277 | 6/1982 | Puri | 381/51 |
| 4,370,729 | 1/1983 | Bosch | 395/400 |
| 4,439,827 | 3/1986 | Wilkes | 395/375 |
| 4,454,578 | 6/1984 | Matsumoto et al. | 395/375 |
| 4,530,050 | 7/1985 | Fukunaga et al. | 395/375 |
| 4,554,627 | 11/1985 | Holland et al. | 395/375 |
| 4,654,781 | 3/1987 | Schwartz et al. | 395/425 |
| 4,714,994 | 12/1987 | Oklobdzija et al. | 395/375 |
| 4,766,566 | 8/1988 | Chuang | 395/375 |
| 4,812,971 | 3/1989 | Butts, Jr. et al. | 395/375 |
| 4,821,183 | 4/1989 | Hauris | 395/375 |
| 4,890,218 | 12/1989 | Bram | 395/375 |
| 4,958,275 | 9/1990 | Yokouchi | 395/375 |
| 5,129,067 | 7/1992 | Johnson | 395/375 |
| 5,202,967 | 4/1993 | Matsuzaki et al. | 395/375 |
| 5,233,694 | 8/1993 | Hotta et al. | 395/375 |
| 5,233,696 | 8/1993 | Suzuki | 395/375 |
| 5,241,637 | 8/1993 | Skruhak et al. | 395/375 |

FOREIGN PATENT DOCUMENTS

| | | |
|---|---|---|
| 63-91739 | 9/1988 | Japan. |
| 2-47725 | 5/1990 | Japan. |
| 2206836 | 10/1991 | Japan. |

OTHER PUBLICATIONS

Multi-Port Asymmetrical Memory Cell, Joy et al. IBM Technical Disclosure Bulletin, vol. 23, No. 7A, Dec. 1980.

"Intel 80386 Programmer's Reference Manual." Chapter 17 (1986).

Kogge, Peter M. "The Architecture of Pipelined Computers." Hemisphere Publishing Corp., 1981, pp. 237–249.

*Primary Examiner*—Parshotam S. Lall
*Assistant Examiner*—Viet Vu
*Attorney, Agent, or Firm*—Marc D. Schechter; Robert P. Tassinari, Jr.

[57] ABSTRACT

A data processing apparatus for simultaneously reading out groups of two or more contiguous, variable length instructions from memory, and for decoding the group of variable length instructions in parallel. The data processing apparatus has a memory containing at least first, second, and third contiguous instructions, and at least first, second, and third read ports for receiving starting addresses and for reading out the instructions from the memory. A next instruction pointer supplies the starting address of the first instruction to the first read port, receives the first instruction, decodes the length of the first instruction, determines the starting address of the second instruction, supplies the starting address of the second instruction to the first read port, receives the second instruction, decodes the length of the second instruction, and determines the starting address of the third instruction. All of these operations are performed in one cycle time. An instruction pointer queue receives and stores the starting addresses of at least the second and third instructions, and supplies the starting addresses to the second and third read ports for simultaneously reading out the second and third instructions from the memory. First and second instruction decoders receive and simultaneously decode the second and third instructions.

8 Claims, 3 Drawing Sheets

APPARATUS FOR CONCURRENT MULTIPLE INSTRUCTION DECODE IN VARIABLE LENGTH INSTRUCTION SET COMPUTER

BACKGROUND OF THE INVENTION

The invention relates to computers in which two or more instructions are decoded in parallel.

In general, a computer program consists of a sequence of instructions. The instructions are usually executed serially (one at a time) no a computer system.

To speed up the execution of a computer program, it may be possible to execute groups of two or more instructions concurrently (in parallel), rather than sequentially (in series). To execute a group of two or more instructions in parallel, the group of two or more instructions must first be decoded in parallel. To decode a group of two or more instructions in parallel, the starting addresses of all of the instructions in the group must be determined.

If all of the instructions in a computer program have the same fixed length, the starting addresses of all instructions in a group will then bear a fixed relationship to the starting address of the first instruction of the group. However, if the instructions have varying lengths, both the starting address and the length of a preceding instruction in the group must be determined before the starting address of the next instruction in the group can be obtained.

SUMMARY OF THE INVENTION

It is an object of the invention to provide a data processing apparatus which can simultaneously read and decode a group of two or more contiguous variable length instructions.

It is another object of the instruction to provide a data processing apparatus which can resolve the starting addresses of a group of two or more contiguous variable length instructions in less time than is required to entirely decode the group of instructions.

According to the invention, a data processing apparatus comprises memory means having a plurality of memory units. Each memory unit has an address. At least first, second, and third instructions are stored in memory units having consecutive addresses. Each instruction occupies at least one memory unit and has a starting address.

The memory means has at least first, second, and third read port means. Each read port means receives the starting address of an instructions, and reads out at least part of the instruction from the memory means.

The data processing apparatus further includes next instruction pointer means for supplying the starting address of the first instruction to the first read port means. The next instruction pointer means then receives the first instruction from the first read port means, and decodes the number of memory units occupied by the first instruction. From this information, the next instruction pointer means determines the starting address of the second instruction, supplies the starting address to the first read port means, and receives the second instruction from the first read port means. The number of memory units occupied by the second instruction is decoded, and the starting address of the third instruction is determined. The next instruction pointer means performs all of these operations in one cycle time.

The data processing apparatus according to the invention further includes an instruction pointer queue buffer means for receiving the starting addresses of at least the second and third instructions from the next instruction pointer means, and for storing the starting addresses. The starting addresses of the second and third instructions are then supplied by the instruction pointer queue buffer means to the second and third read port means for simultaneously reading out at least part of the second and third instructions from the memory means.

In one aspect of the invention, the next instruction pointer means comprises length decoding means for decoding only the number of memory units occupied by an instruction starting at a starting address, and adding means for adding the length of the instruction to the starting address of the instruction to obtain the starting address of the next instruction.

The memory means may comprise, for example, a prefetch buffer having a plurality of memory units. First, second, and third multiplexers may be provided for receiving starting addresses of instructions in the prefetch buffer, and for reading out at least part of the instructions from the prefetch buffer.

The data processing apparatus may further comprise first instruction decoding means for receiving the second instruction from the memory means and for decoding the entire second instruction. Second instruction decoding means may be provided for receiving the third instruction from the memory means, and for decoding the entire third instruction.

The first and second instruction decoding means decode instructions in not less than one cycle time.

Preferably, the first and second instruction decoding means simultaneously decode entire instructions.

It is also preferred that at least one instruction decoding means decodes an instruction at the same time that the next instruction pointer means determines the starting addresses of at least two instructions following the instruction being decoded.

Each read port of the memory means may comprise, for example, a multiplexer.

Each memory unit is preferably one byte (8 binary digits). The instructions occupy varying numbers of memory units.

By combining a three-read-port memory with a next instruction pointer, and an instruction pointer queue according to the invention, groups of two or more variable length instructions can simultaneously be read and decoded.

DESCRIPTION OF THE PREFERRED EMBODIMENTS

Figure 1:
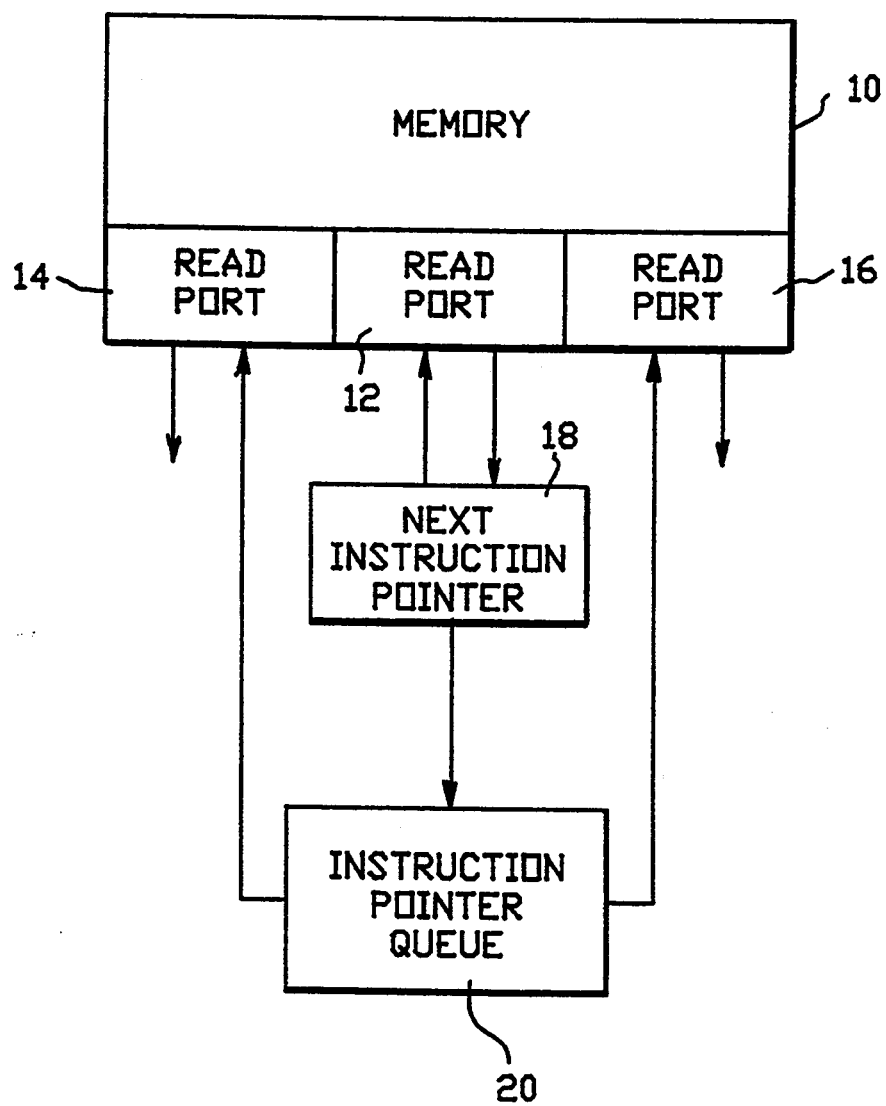
FIG. 1 is a block diagram of an example of a data processing apparatus according to the invention for simultaneously reading out a group of two contiguous variable length instructions from memory.

FIG. 1 is a block diagram of an example of a data processing apparatus according to the invention for simultaneously reading out a group of two contiguous variable length instructions from memory. As shown in FIG. 1, the data processing apparatus comprises memory means 10 having a plurality of memory units. For example, a memory unit may be one byte which consists of eight binary digits (bits) of data. Each memory unit in memory 10 has an address.

At least first, second, and third instructions are stored in memory units having consecutive addresses. Each instruction occupies at least one memory unit in the memory means, and has a starting address.

In one example, the memory means may be divided into pages of memory units. Each page of memory units may, in turn, be divided into lines of memory units. In this example, the address of a memory unit can be uniquely specified by identifying the number of the page in which the memory unit is contained, the number of the line containing the memory unit, and the position of the memory unit on the line (i.e. the line offset). For example, if each line contains 32 bytes, the line offset can be specified by the lowest 5 bits of the address.

Memory means 10 further includes at least first, second, and third read port means 12, 14, and 16, respectively. Each read port means receives the starting address of an instruction, and reads out at least part of the instruction from the memory 10.

The data processing apparatus further includes a next instruction pointer means 18 for supplying the starting address of the first instruction to the first read port means 12, and for receiving the first instruction from the first read port means 12. The next instruction pointer means 18 decodes the number of memory units occupied by the first instruction, determines the starting address of the second instruction, and supplies the starting address of the second instruction to the first read port means 12. The second instruction is received from the first read port means 12, the number of memory units occupied by the second instruction is decoded, and the starting address of the third instruction is determined. The next instruction pointer means 18 performs all of these operations in one cycle time.

An instruction pointer queue buffer means 20 receives the starting addresses of at least the second and third instructions from the next instruction pointer means 18, and stores the starting addresses. The instruction pointer queue buffer means 20 supplies the starting addresses of the second and third instructions to the second and third read port means 14 and 16, respectively, for simultaneously reading out at least part of the second and third instructions from the memory means.

Figure 2:
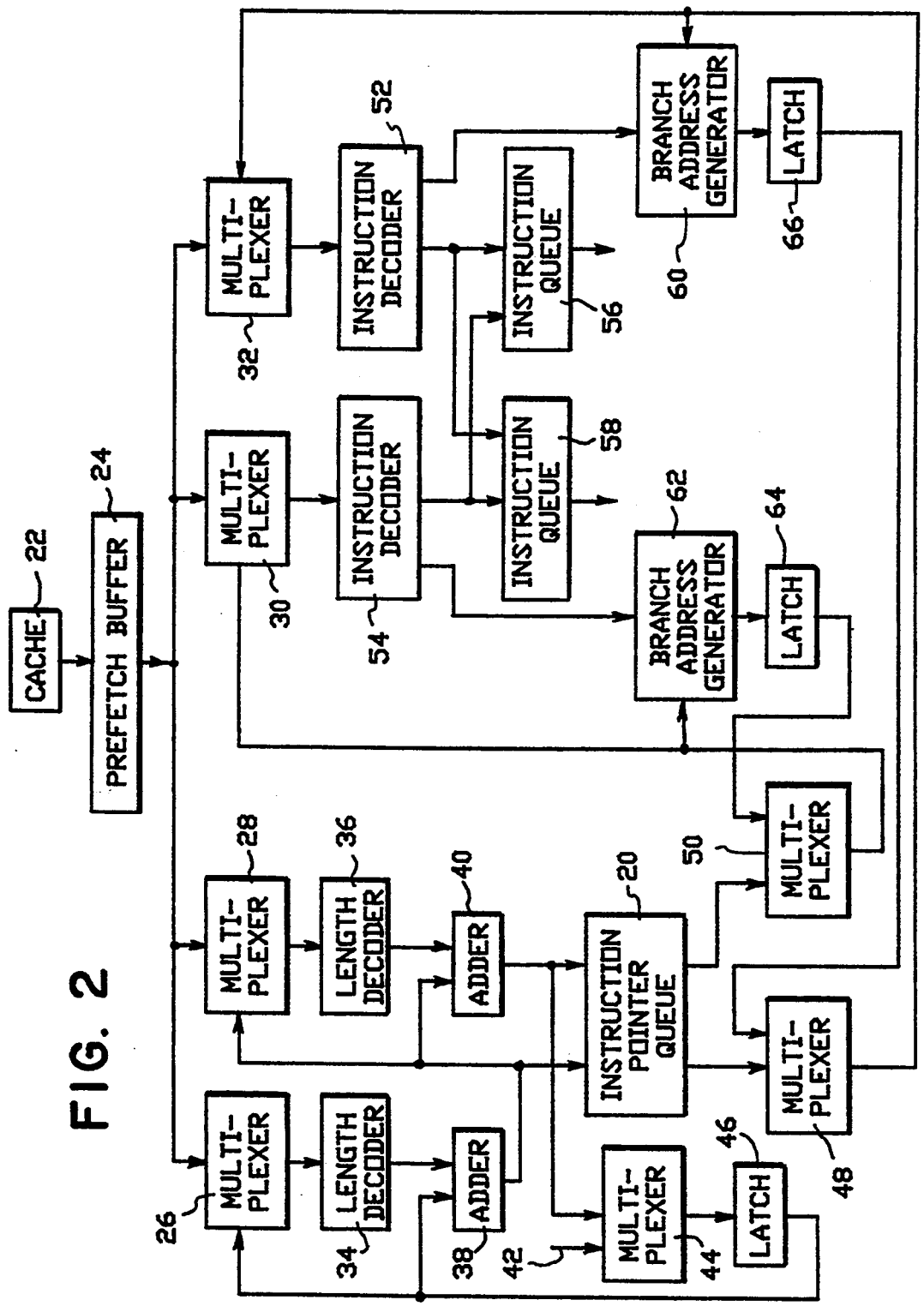
FIG. 2 is a block diagram of an example of a data processing apparatus according to the invention for simultaneously reading and decoding a group of two contiguous variable length instructions.

FIG. 2 is a block diagram of a more detailed example of a data processing apparatus according to the present invention. In this example, the memory means 10 comprises a set-associative cache 22, a prefetch buffer 24, and multiplexers 26, 28, 30 and 32.

The set-associative cache 22 contains a plurality of rows of bytes. Each cache row may, for example, correspond to one set of four cache lines of 32 bytes per cache line (128 bytes per set). Each cache line may, for example, be indexed with a page number. Therefore, each byte in the cache can be addressed by page number, cache line number, and line offset.

Prefetch buffer 24 is preferably the same size as a line in cache 22. When a cache line is loaded into prefetch buffer 24 from cache 22, the prefetch buffer 24 is indexed with the page number and the cache line number. The line offset of each byte in prefetch buffer 24 is the same as the line offset of the byte in cache 22.

Cache 22 and prefetch buffer 24 may be static random access memory (SRAM) or registers.

Preferably, two prefetch buffers are provided for holding two consecutive cache lines from cache 22. While each prefetch buffer may be one row of 32 bytes (in this example where each cache line consists of 32 bytes), preferably each prefetch buffer consists of eight rows of four bytes per row.

Multiplexers 26, 28, 30 and 32 form the read ports of the memory means. Each multiplexer is the same width as the prefetch buffer 24 (in this example, 32 bytes wide), and contains an address decoder for receiving a starting address and for selecting a number of consecutive bytes from that starting address for reading out of prefetch buffer 24. If there are 32 bytes in prefetch buffer 24, each multiplexer receives a five bit offset address. If there are two prefetch buffers, each multiplexer receives a six bit address, consisting of a five bit offset address and one bit for selecting one of the two prefetch buffers.

In this example, each multiplexer 26 and 28 reads out of the memory means sufficient bytes to obtain the length of an instruction. Each multiplexer 30 and 32 reads out of the memory means sufficient bytes to decode the entire instruction.

The next instruction pointer means 18 of FIG. 1 may comprise, for example, length decoders 34 and 36 and adders 38 and 40 shown in FIG. 2. Each length decoder 34 and 36 decodes only the number of memory units occupied by the instruction starting at the starting address supplied to the associated multiplexer 26 and 28, respectively. Adding means 38 and 40 add the length of the instruction to the starting address of the instruction to obtain the starting address of the next instruction.

At the start of a computer program or upon the detection of a branch, the starting address of the first instruction is provided on bus 42. The starting address on bus 42 is selected by multiplexer 44 (for example, under the control of the operating system), and may be stored in a latch 46. The starting address of the first instruction is then supplied to multiplexer 26 an to adder 38. Multiplexer 26 supplies the first instruction from prefetch buffer 24 to length decoder 34 which decodes the number of memory units occupied by the first instruction, and supplies this number to adder 38. Adder 38 adds the length of the instruction to the starting address of the instruction to obtain the starting address of the second instruction.

The starting address of the second instruction is supplied by adder 38 to multiplexer 28 and to adder 40. Multiplexer 28 provides the second instruction from prefetch buffer 24 to length decoder 36. Length decoder 36 decodes the number of memory units occupied by the second instruction, and supplies this number to adder 40. Adder 40 adds the length of the second instruction to the starting address of the second instruction to obtain the starting address of the third instruction.

Adder 38 supplies the starting address of the second instruction, and adder 40 supplies the starting address of the third instruction to instruction pointer queue 20. Instruction pointer queue 20 receives the starting addresses and stores them in the order received.

Instruction pointer queue 20 may be, for example, a first-in, first-out register stack or random access memory having two input ports and two output ports.

On a first-in, first-out basis, instruction pointer queue 20 supplies the starting addresses of the second and third instructions to multiplexers 48 and 50 which, if no branch is detected, provide the starting addresses to multiplexers 30 and 32. Multiplexers 30 and 32 simultaneously read out at least part of the second and third instructions from the memory means.

Preferably, multiplexers 30 and 32 simultaneously supply two instructions to first and second instruction decoding means 52 and 54. Each instruction decoder decodes the entire instruction which it receives. The decoded instructions may be provided to instruction queues 56 and 58. Instruction queue 56 may, for example, contain memory operation instructions. Instruction queue 58 may, for example, contain register to register instructions.

If an instruction has a length greater than the number of bytes which can be read out of multiplexers 30 and 32 in one cycle (for example, four bytes), or if an instruction has a length greater than the number of bytes which can be decoded by instruction decoding means 52 or 54 in one cycle, the decoding means 52 or 54 will continue to decode the instruction in a second decode cycle. In the second decode cycle, the instruction decoding means will operate on a series of bytes starting at an address equal to the original instruction address plus the number of bytes previously operated on (for example, four bytes), instead of the next instruction address in the instruction pointer queue 20.

The decoded instructions are also provided to branch address generators 60 and 62. Branch address generator 60 receives the starting address of the instruction from multiplexer 50, receives the decoded instruction from decoder 54 and supplies a branch target address to latch 64 If there is a branch detected, the branch address from latch 64 is selected by multiplexer 50, and is supplied to the multiplexer 30 on the next cycle.

Similarly, branch address generator 60 receives the starting address of an instruction from multiplexer 48, receives the decoded instruction from decoder 52, and supplies a branch target address to latch 66. If a branch is detected, the branch address from latch 66 is selected by multiplexer 48, which passes the branch address to multiplexer 32 on the next cycle.

When a branch is detected, the instruction pointer queue 20 is cleared, and the length decoders 34 and 36 are initialized.

The branch address is supplied to bus 42, and is selected by the multiplexer 44. The decoding of instructions lengths then proceeds in the manner described above.

If the branch address is outside of the cache line contained in the prefetch buffer 24, the cache line containing the branch address is loaded from cache 22 into the prefetch buffer 24.

If there is no branch, the starting address from adder 40 is selected by multiplexer 44 and is stored in latch 46. On the next cycle, the starting address from latch 46 is provided to multiplexer 26, and the starting addresses of the next two instructions are decoded and stored in instruction pointer queue 20, in the manner described above.

In order to minimize idle time of instruction decoders 52 and 54, each instruction decoder decodes an instruction in a time which is not less than the time in which the length decoders 34 and 36 and the adders 38 and 40 provide the starting addresses of two instructions to instruction pointer queue 20 (that is, in not less than one cycle time). Preferably, each instruction decoder decodes an instruction at the same time that the next instruction pointer means determines the starting addresses of at least two instruction following the instruction being decoded.

In one example, the data processing apparatus according to the present invention may be used to simultaneously read out a group of two or more variable length instructions from the instruction set for the Intel 386 (trademark) microprocessor. In this case, the instruction length may be from one to fifteen bytes. The length of an instruction can be determined from the first four bytes of the instruction.

Figure 3:
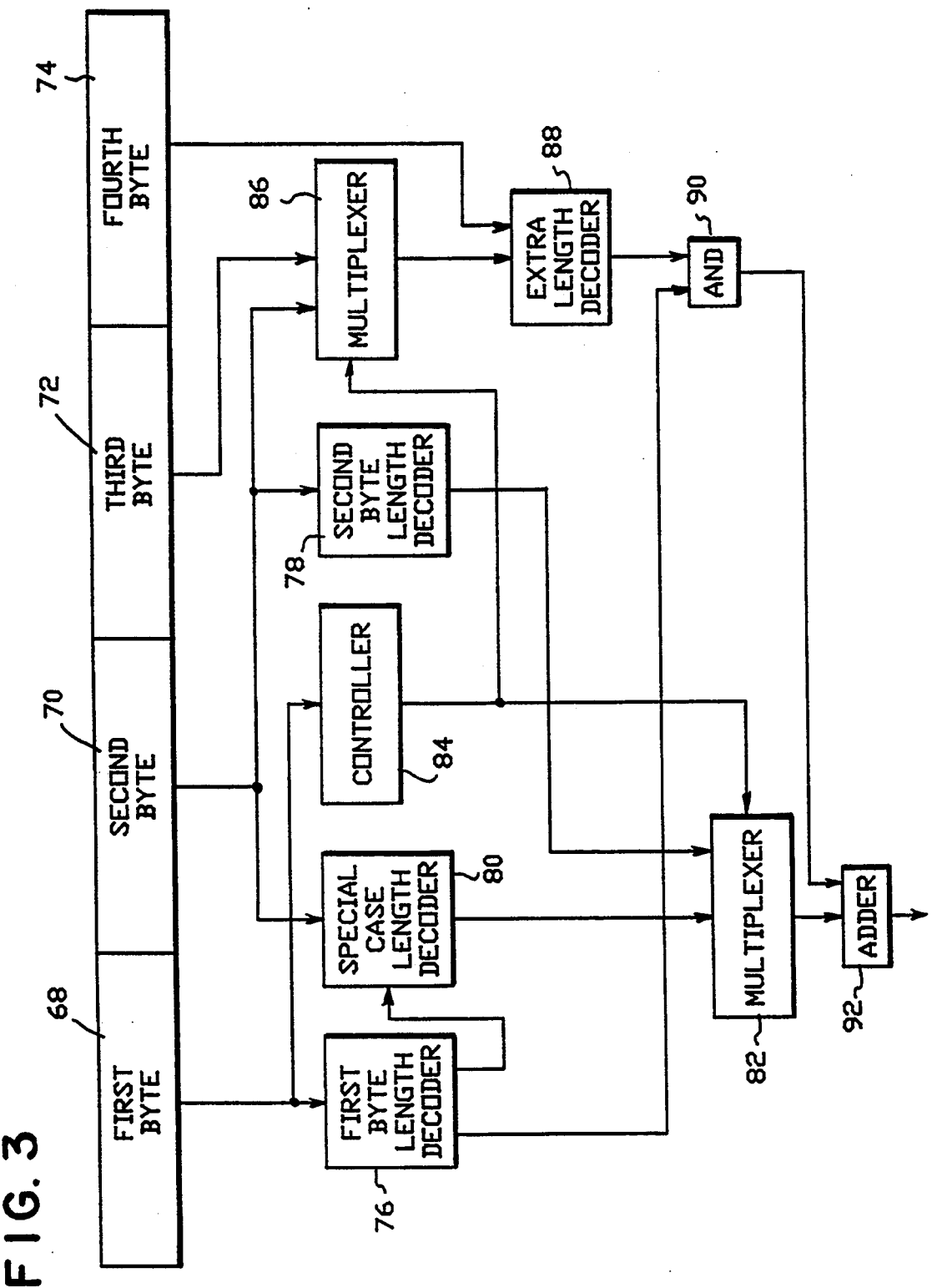
FIG. 3 is a block diagram of an example of a length decoder for use in a data processing apparatus according to the invention.

FIG. 3 is a block diagram of an example of a length decoder for the instruction set of the Intel 80386 (trademark) microprocessor. The length decoder receives the first, second, third, and fourth bytes 68, 70, 72, and 74, respectively, of an instruction. The first byte 68 and the second byte 70 are provided to length decoders 76 and 78. The output of length decoder 76 and the second instruction byte 70 are provided to a special case length decoder 80 for extra processing. The length outputs from decoders 78 and 80 are provided to a multiplexer 82. Multiplexer 82 selects the output of length decoder 78 or length decoder 80 on the basis of a control signal from a controller 84 which generates a control signal from the first instruction byte 68.

The second instruction byte 70 and the third instruction byte 72 are provided to a multiplexer 86 which passes either the second byte 70 or the third byte 72 to an extra length decoder 88 under the control of the signal from controller 84. Extra length decoder 88 also receives bits 5, 6, and 7 from the fourth instruction byte 74 and outputs an extra length signal to AND gate 90. The extra length from decoder 88 is ANDed with an output from first byte length decoder 76. The result of the AND gate 90 and the output of multiplexer 82 are added in adder 92 to provide the instruction length.

The interpretations of the bits in instruction bytes for generating length and control signals are described in the "Intel 80386 Programmer's Reference Manual", chapter 17 (1986).

In the case of the instruction set for the Intel 80386 (trademark) microprocessor, some instructions contain prefix bytes which precede the instruction. When length decoder 34 or 36 recognizes that it is operating on a prefix, the starting address generated by adder 38 or 40 is passed to the next multiplexer 26 or 28, but is not stored in instruction pointer queue 20.

I claim:
1. A data processing apparatus comprising:
a single memory means having a plurality of memory units, each memory unit having an address, at least first, second, and third instructions being stored in a number of memory units having consecutive addresses, each instruction occupying at least one memory unit, each instruction having a starting address, said memory means having at least first, second, and third read port means, each read port means for receiving the starting address of an instruction, and for reading out at least part of the instruction from the memory means;
next instruction pointer means for supplying the starting address of the first instruction to the first read port means, for receiving the first instruction from the first read port means, for decoding the number of memory units occupied by the first instruction, for determining the starting address of the second instruction, for supplying the starting address of the second instruction to the first read port means, for receiving the second instruction from the first read port means, for decoding the number of memory units occupied by the second instruction, and for determining the starting address of the third instruction in one cycle time, the next instruction pointer means comprising:

length decoding means for decoding only the number of memory units occupied by an instruction starting at a starting address, and adding means for adding the length of the instruction to the starting address of the instruction to obtain the starting address of a next instruction; and instruction pointer queue buffer means for receiving the starting addresses of at least the second and third instructions from the next instruction pointer means, for storing the starting addresses of at least the second and third instructions, and for supplying the starting addresses of the second and third instructions to the second and third read port means for simultaneously reading out at least part of the second and third instructions from the memory means;

wherein the first instruction does not contain the addresses of the second and third instructions.

2. A data processing apparatus as claimed in claim 1, characterized in that the memory means comprises:

a prefetch buffer having a plurality of memory units; and first, second, and third multiplexers for receiving starting addresses of instructions in the prefetch buffer, and for reading out at least part of the addressed instructions from the prefetch buffer.

3. A data processing apparatus as claimed in claim 2, further comprising:

first instruction decoding means for receiving the second instruction from the memory means, and for decoding the entire second instruction; and second instruction decoding means for receiving the third instruction from the memory means, and for decoding the entire third instruction.

4. A data processing apparatus as claimed in claim 3, characterized in that:

the first instruction decoding means decodes an instruction in a time which is not less than one cycle time;

the second instruction decoding means decodes an instruction in a time which is not less than one cycle time.

5. A data processing apparatus as claimed in claim 4, characterized in that the first and second instruction decoding means simultaneously decode entire instructions.

6. A data processing apparatus as claimed n claim 4, characterized in that at least one instruction decoding means decodes an instruction at the same time that the next instruction pointer means determines the starting addresses of at least two instructions following the instruction being decoded.

7. A data processing apparatus as claimed in claim 4, characterized in that each read port comprises a multiplexer.

8. A data processing apparatus as claimed in claim 4, characterized in that each memory unit is one byte, and the instructions occupy varying numbers of memory units.

* * * * *